Nov. 19, 1957
A. EGLE ET AL
2,813,960
ELECTRIC SURFACE HEATER
Filed Jan. 25, 1952
3 Sheets-Sheet 1
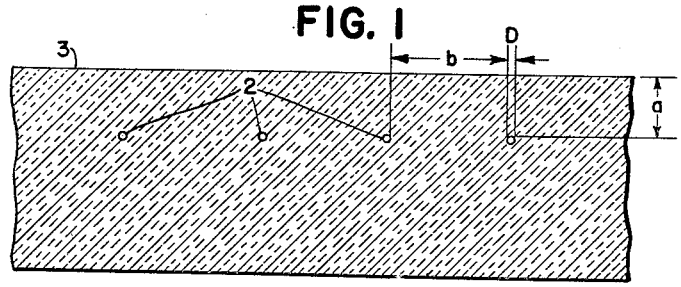
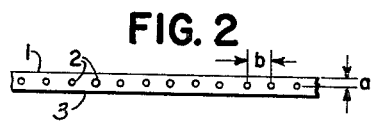
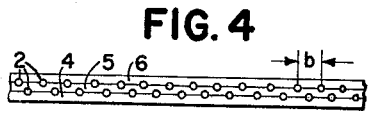
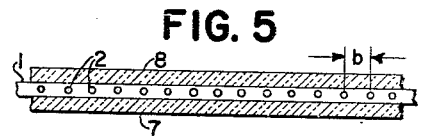
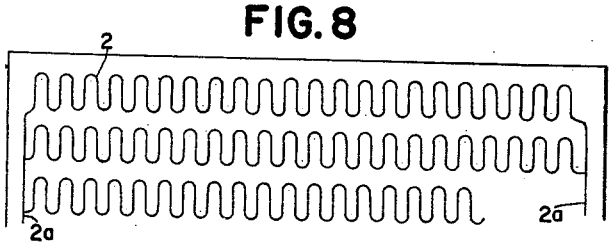
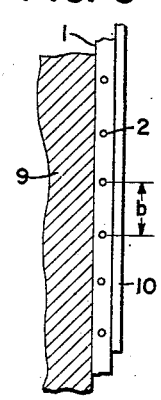
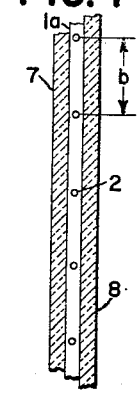
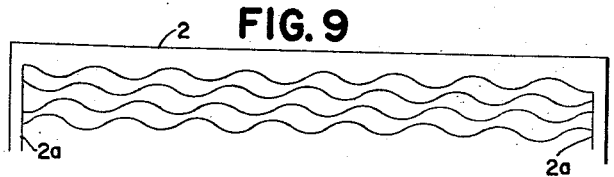
INVENTOR
ARTHUR EGLE
WALTHER BETHGE
BY  *Richards & Geier*
ATTORNEYS Nov. 19, 1957 A. EGLE ET AL 2,813,960
ELECTRIC SURFACE HEATER
Filed Jan. 25, 1952 3 Sheets-Sheet 2

INVENTOR
ARTHUR EGLE
WALTHER BETHGE

BY Richard y Geier
ATTORNEYS

Nov. 19, 1957  A. EGLE ET AL  2,813,960
ELECTRIC SURFACE HEATER
Filed Jan. 25, 1952  3 Sheets-Sheet 3
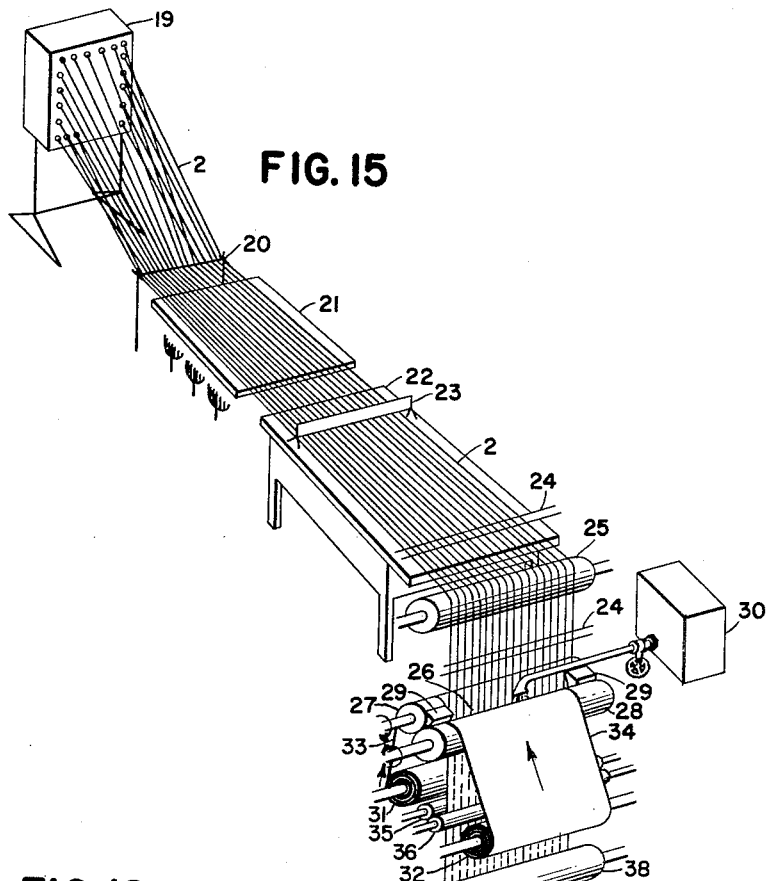
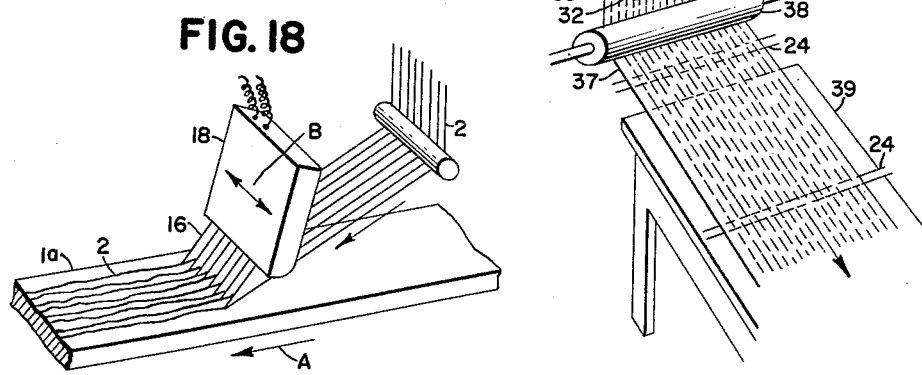
INVENTOR
ARTHUR EGLE
WALTHER BETHGE
BY Richards Geier
ATTORNEYS United States Patent Office 2,813,960
Patented Nov. 19, 1957

2,813,960

ELECTRIC SURFACE HEATER

Arthur Egle, Zollikon-Zurich, and Walther Bethge, Adliswil, Zurich, Switzerland, assignors, by direct and mesne assignments, to said Walther Bethge, and Jean-Pierre de Montmollin and Rene Gugger, Neuchatel, Switzerland Application January 25, 1952, Serial No. 268,298

3 Claims. (Cl. 219—19)

The present invention relates to electric surface heaters with imbedded heating elements, particularly heating screens and heating foils, and a process for producing the same.

Many different proposals for surface heating are known but no generally satisfactory solution to this heating problem has yet been found. Most of these proposals provide electric resistance conductors for energy transformation. However, the question of heat transfer has been more or less neglected. Construction of such surface heaters is unsatisfactory and the operating limit is reached with low specific heat transfer. Proposals have been made which suggest, instead of direct heat transfer from the heating conductor to the heater body, indirect heating through air, or which eliminate conventional resistance conductors and provide transparent metallic layers or conductive plastic materials and rubber, whereby an equal heating of the whole area of the heater can be attained. However, these systems have other disadvantages which prevent their general use.

The invention is based on the fact that for the intake or output of the heat necessary in practical use with surface heaters bodies, having a constant surface temperature, it is very important to reduce the temperature of the heating conductor and also to reduce the temperature differences in the material surrounding the individual wires so that the material surrounding the wires is safe. According to the invention this is achieved by providing a multitude of very thin heating wires arranged at a small distance from each other close to the surface of the heater, whereby the wire surface is increased to such an extent that the wire temperature is considerably lower than in known installations, having the same heating output.

According to the invention each individual heating wire is surrounded by the material of its carrier (heater body) of such a thickness that the ratio between the distance of the individual heating wire from the surface of the heater body and the distance between the wires is not smaller than $1:\pi$. If this inventive concept is used as a basis for design, the heater will give off heat at all points. To ensure an equal temperature distribution over the whole heated surface it is proposed, according to the invention, that the ratio mentioned above shall not be smaller than $2:\pi$. The invention also relates to the choice of wire diameter. Good results are obtained if the diameter of the heating wire is $\frac{1}{10}$ of the distance between the heating wire and the surface of the heater body or less.

The invention is not limited to the usual arrangement of parallel heating wires. The heating wires can be arranged in zigzag fashion along their main direction parallel to the surface of the heater body, the wire material is not limited to the usual heating conductor materials but the whole range of materials available can be used.

In the application of the invention to heating screens it is proposed to eliminate the reduction of visibility due to reflection effects of thin wire inserts by dulling the surface of the heating wires. To eliminate the refraction effects, the invention comprises the arrangement of the heating wires in wave-like fashion. It is of advantage if these individual heating wire waves are staggered with respect to each other (shifted phases). To attain optimum conditions for the elimination of the refraction effects it is of advantage to make the change in direction of the waves of the heating wires progressively equal. Experience shows that particular advantages are gained, if the amplitude of the waved heating wires is smaller than half the mean distance between the waves and if the wave length is at least four times the amplitude. In this way it is possible to reduce the effect of reflection and refraction. Thus it is possible to arrange even thinnest wires at far smaller distances between each other than would be possible otherwise.

Furthermore the invention contemplates imbedding of the current supply conductors together with the heating wire as a complete heating element into the heater body material so that only the supply lines are led out of the latter, whereby better protection of the surface heater from mechanical and corrosive damages during use is ensured. The current supply wires are shaped as bands having the same or approximately the same thickness as the heating wire diameter, whereby the whole arrangement becomes thinner and more flexible and cannot be effected by bending or deformation of the heating body. In accordance with the technical requirements current transfer can be effected through a conventional contact (in case of weaving) or through brazing or welding. Depending on the heating output, the connection between the heating wires and the current supply line to the heating element can be of any kind though for easier production the heating wires are preferably arranged in parallel.

The scope of the invention is not limited to the construction of the heating element with pre-formed wires as described previously. The heating element may be formed by a thin conducting layer produced by a chemical or physical method on a carrier, preferably the heater body material, by known galvanic, photo-chemical or printing methods.

An important characteristic of the invention is the fact that the heating element described previously can be imbedded in organic materials, e. g. cellulose derivatives, polyvinyls, polyamides or silicones and others, or in ceramic materials as well as glass so that these materials can be generally used for area heating either in transparent or opaque bodies, whereas with the conventional heating body construction these materials could not be used due to their low strength at elevated temperatures and their sensitivity to heat stresses. The improvement over conventional constructions is shown clearly by the fact that even conventional silicate glass can be used successfully.

The subject of the invention can be applied in various ways and is generally suitable for surface heaters of any kind, form and application. Thus, the invention may, for instance, be applied to heating screens, heating wallpapers, heating carpets, heating cushions, propeller and wing de-icers and the like. The surface heater bodies may be rigid, flexible or elastic. Due to the low peak temperatures inside the heater body and despite the small thickness of the latter an equal temperature distribution over the whole surface is attained even during most intensive heating. Combined with this advantage is the low thermal inertia which results in rapid heating unattainable with conventional constructions. Due to the complete imbedding of the heating element in the insulating heater body material the danger of short circuits is substantially reduced. Furthermore, even if individual heating wires are touched no adverse effects on health occur since the higher resistance of the wires permits only a small current which is harmless.

The invention may particularly be applied to transparent materials, especially since the loss of light due to the heating insert can be kept low. A novel feature of this arrangement is the fact that the heating wires are thin enough to be visible only to the trained, accommodated eye, so that the field of vision is not limited or impaired. Such heating elements can even be successfully imbedded in the films used for producing compound glass. Since the heat effect of the heating elements is low, no adverse effects on the film or on the safety glass produced therewith occur and vision is not impaired due to local changes of the refraction index on heating. With such heating screens, as well as in the general case, it is not necessary to use the same insulating material in homogeneous union on both sides of the heating element. Thus, it is possible to employ a different heating body material on one of the two sides.

The production of the described heating elements and their employment for area heating bodies presents certain difficulties which increase considerably with decreasing heating wire diameter. The handling of these fine wires requires high skill so that, apart from the high production costs, practical utilisation would not be possible if the manual work could not be reduced to a minimum by means of suitable manufacturing processes which permit mass-production. The invention thus comprises manufacturing processes which make possible the economic production of such area heating bodies.

Considerable simplification of production is attained by running the heating wires in a suitable loom as warps whereby the current supply wires, of approximately the same diameter and woven in suitable quantity into bands, form the wefts spaced at distances from each other as required. It is, of course, also possible to exchange warps and wefts. In this manner, heating element joined to heating element can be produced in an unlimited series. According to the invention, the loom may be replaced by a device which brings the fine wires from the spool carrier to their required end position and then secures the heating wires temporarily in this position until the current supply bands are brazed or welded on at suitable intervals. Thereby the wires are better secured in position until they are imbedded in the insulating heating body material.

Immediately afterwards, imbedding takes place which varies according to the heating body material. To simplify and increase production this can be done by means of an automatic device which is coupled to the heating element producing machine. This device may be built similar to a cardboard machine. The band thus obtained can be cut to the required size and passed on for further working operations.

The production process can, according to the invention, be further simplified (e. g. for plastic materials) in that the pre-manufacture of the heating elements is eliminated so that special measures for securing the wires in their position are not necessary. This can be done if the heating wires and the current supply lines are attached directly to the carrier foil by means of special devices for guiding and placing the wires.

One embodiment, in its simplest form, uses a carrier film the surface of which has been made adhesive by suitable means. In another example, the carrier film is softened only locally and only during the time the wire is pressed on. In a further example of the invention the wire is pressed into the film locally softened in this manner, by means of a suitably shaped sliding guide. The carrier foil is softened by special means attached to the sliding guide either by wetting with a softening solution or by heating (for thermoplastic materials). Such constructions have the advantage that the heating wire can be fastened to the carrier in any shape, particularly in zigzag fashion or in waves as described above. For faster manufacture a suitable number of such wire guides can be employed together and fastened to a guide rail which carries the wire spool holders, heaters and the like. Thus, it is possible to attach in one operation one or more heating elements to their carriers. The guide rail is preferably arranged in such a way that the sliding guides can be pulled over the foil, whereby the pressure can be adjusted as required. For arranging the wires in zigzag fashion to the carrier the wires are placed on the prepared carrier by the placing device according to the advancing movement of the latter whereby either the placing device or the carrier or both execute a positively controlled periodical movement transversal to the feed direction of the wires. To obtain waves which are staggered the guides of the placing device are staggered with respect to each other and execute the same movements. Due to the staggered position of the guides the individual wave lines on the carrier are shifted with respect to each other. By using zigzag or wave wires the length of the individual wires can be considerably increased while the surface heating remains uniform. Thus, the adaption of the heating resistance to the required performance is facilitated. It is also possible to use wires of different thickness or different materials when placing the wires on the carrier, in order to obtain any desired resistance and heating output. The heating wires and the supply wires which are arranged in similar manner can be connected by brazing or welding during the operation described above either before or after the supply wires have been fastened locally. When compared with the production method described previously, this process has the advantage that more different heating element arrangements can be produced in a simpler manner.

The manufacturing processes described which may be used as required by the circumstances, do not only eliminate the difficulties which would otherwise prevent the introduction of the heater but, beyond the initial aim, they also permit a further decrease of the heating wire diameter, the distance between the wires and the distance of the heating element from the heater surface so that the latter can be made thin like a foil. As experiments have shown, it is easily possible to use heating wires down to 0.01 mm. diameter (the technical production limit for fine wires) with a distance of 0.1 mm. between the wires and to imbed such heating elements in foils of 0.2 mm. thickness. The performance of such heating foils is multiplied whereby the subject of the invention can be more widely applied in the field of surface heating, e. g. for heating blinds for protecting windows from steaming and freezing, for heating cushions, for heating poultices for medical purposes, for heating inserts, for heat retaining devices, for hatching devices, for heating attachments for aircraft de-icing and for many other purposes.

According to the invention, such heating foils can be joined rigidly to other materials, whereby a higher strength, desirable in certain cases, and a better-protection from mechanical damages is ensured, e. g. for heating wallpapers, heating floor covers or heating compound glass for transport means of all types, shop-windows and the like.

Apart from using the heating screens as described, the invention comprises furthermore the use of such heating screens which are attached to a basic screen, whereby an air gap and a sealing fastening strip near the edge of the screen are provided. Preferably the sealing strips are made from colourless, transparent, insoluble and liquid-proof films of high adhesive strength which form a perfect and durable, safe seal for the gap between the two screens. Thereby, special holding means which impair visibility are eliminated, the sealed, dry air or gas gap is kept free of dust producing materials and the heat is dissipated in one preferred direction. Apart from normal glasses, special protective glasses through which only certain radiation can pass can also be used as basic screens. Furthermore it is possible to "improve" the whole surfaces or the inside part of the screen arrangement in order to reduce reflection. Finally, several screens may be combined, to obtain a particularly effective heat insulation or sound absorption in one direction.

To reduce the current consumption and to prevent inadvertent operation, a regulating or interrupting control device in the main circuit which is controlled by the heating or room temperature, or if required an automatic protection switch can be provided which may, for instance, during standstill of a vehicle switch the current off and during operation of the same close the main circuit.

In the accompanying drawings several examples of electric surface heaters, particularly heating foils and heating windows, and of processes for producing surface heaters in accordance with the present invention are shown. In the drawing:

Fig. 1 is a section through a surface heater taken vertical to the longitudinal direction of the individual heating wires with preferred heating in one direction, in diagrammatical representation;

Fig. 2 is a transversal section through a heating foil for equal heating in both directions;

Fig. 3 is a section through a glass window with enclosed heating element with preferred heating to the surface exposed to the weather;

Fig. 4 is a section through a heating foil with two heating elements;

Fig. 5 is a sectional view of a heating foil placed between two plates;

Fig. 6 is a section of a heating foil attached to a wall;

Fig. 7 is a sectional view of a heating screen made from compound glass and similar to the one shown in Fig. 5;

Fig. 8 is a plan view of a surface heater in which the heating wires are arranged in zigzag fashion;

Fig. 9 is a view of an example of the wave-like design of the heating element for heating screens;

Fig. 15 is a view of a machine for manufacturing heating elements and imbedding the latter continuously between two films;

Fig. 18 is a diagrammatic view of a device for placing heating wires on to a thermoplastic film.

Figure 10:
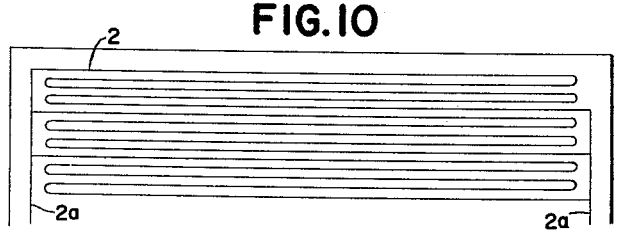
Figs. 10 and 11 are views of other arrangements of heating and connecting wires.

In Fig. 1 a constructional example of the invention is shown in diagrammatic form. 1 designates the material of the heater body in which the heating wires 2 are imbedded. 3 is the surface of the heater body which serves for the main heat radiation. The individual heating wires 2 are arranged at a distance $a$ from this heat radiating surface. The distance between the heating wires is designated as $b$, their diameter by D. According to the invention, the ratio $a$ to $b$ is smaller than $1:\pi$. Thereby heat is given off at all parts of the surface 3. If the ratio $a$ to $b$ is made bigger than $2:\pi$ an equal temperature distribution on the surface 3 of the heater body is guaranteed in any case. Preferably, the heating wire diameter D is about $\frac{1}{10}$ of the distance $a$ of the heating wires 2 from the surface 3 or less.

Fig. 2 shows a cross section of a heating foil 1 of approx. 0.2 mm. thickness. The distance $b$ between the heating wires 2 is also approx. 0.2 mm., the wire diameter is 0.01 mm. and the distance $a$ between the surface and the heating element is approx. 0.1 mm.

Fig. 3 shows a heating screen with enclosed heating element. The thickness of the glass 1 is approx. 5 mm., the wire interval $b$ is 2 mm. and the diameter of the wire 0.1 mm. The wire 2 arranged in the glass screen 1 has a distance $a$ of 1 mm. from one side of the window screen, whereby the heat is given off mainly on the surface subjected to the weather.

Fig. 4 again shows a section through a heating foil of approximately 0.5 mm. thickness. This foil consists of three layers, which are homogeneously joined, and two heating elements. This arrangement permits the variation of the heating output in steps. The lowest layer 4 has a thickness of approx. 0.2 mm., the thickness of the middle layer 5 is 0.1 mm. and that of the top layer is again 0.2 mm. Between the layers two heating elements are arranged. The distance $b$ between the wires is 0.5 mm. and the thickness of the wire is 0.02 mm.

Fig. 5 shows a section through a heatable compound glass screen. The distance $b$ between the wires is approx. 2.5 mm., the wire diameter is 0.1 mm. The foil 1 between the glass screens 7 and 8 in which the wires 2 are imbedded has a thickness of 0.5 mm.

Fig. 6 shows a heating foil 1 attached to a wall 9. The heating foil 1 has a thickness of 0.3 mm. The diameter of the wire 2 is 0.05 mm. The distance $b$ between the wires is 1 mm., and the wall paper pasted over the foil has a thickness of approx. 0.2 mm.

Fig. 7 shows a heating screen of compound glass similar to Fig. 5 and consisting of two glass screens 7 and 8 joined by a safety film 1a in which the heating wires 2 are arranged. The foil 1a has a thickness of 0.4 mm. and the diameter of the wire 2 is 0.01 mm. and the wire distance is 3 mm.

Fig. 8 is a plan view of the heating foil with the heating element, from which the zigzag arrangement of the heating wires and their connection to the current supply lines is evident.

Fig. 9 shows a heating screen for transport means in which the heating wires 2 are arranged wave-like and staggered with respect to each other. The change of the direction of the waves of the heating wires is progressively uniform. The amplitude of the wave-like arranged heating wire is made smaller than half the mean distance between the waves. In the example according to Fig. 9 the wave length is furthermore at least four times the amplitude. The ends of the heating wires 2 are welded or brazed to the current supply wires 2a.

Fig. 10 shows a surface heater, the heating wires 2 of which are arranged meander-like, and the connection of the latter with the current supply lines 2a.

Figure 11:
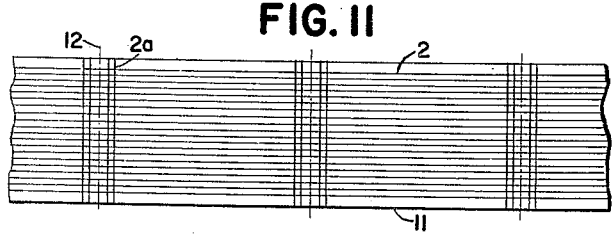

Fig. 11 shows the arrangement of the heating wires 2 side by side on a base 11. The heating wires are connected by current supply wires 2a. The dot and dash line 12 shows the dividing line along which the band is divided in individual heating elements.

Figure 13:
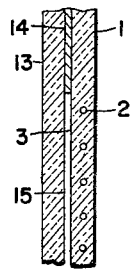
Fig. 13 is a section through the double screen in accordance with Fig. 12 along the line I—I.
Figure 12:
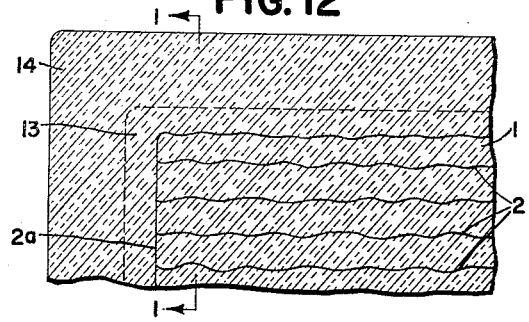
Fig. 12 is a corner view of a heating screen in connection with a basic window (double screen)

Fig. 12 shows a corner of a double-screen which consists of a basic screen and a heating screen between which an air or gas gap is provided. 1 is the material of the heater body in which the heating wires 2 are imbedded. 3 is the surface of the heating screen (Fig. 13). The individual heating wires have between themselves and from the heat radiating surface the distances already mentioned. The heater 1, 2, 3 is connected with a basic screen 13 by means of a transparent film strip 14 which rigidly joins the two screens 1 and 13 along their edges. Between the two screens 1 and 13 an air or gas gap 15 is formed corresponding to the thickness of the film strip 14 (Fig. 13). The width of the latter can be chosen as suitable. The film strips 14 are insoluble by liquids and also liquid proof.

Fig. 13 shows a double screen according to Fig. 12 in a section along the line I—I.

Figure 14:
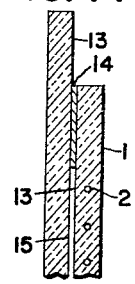
Fig. 14 is a section through another example with projecting basic screen.

Fig. 14 shows a basic screen 13 on which a small heating screen 1 is placed. This arrangement is suitable for supplementary installation.

Fig. 15 shows a machine for the production of heating elements for surface heaters, for instance, like the one shown in Fig. 11. The carrier 19 carries the spools of the heating wire 2 which are not shown in the drawing. Instead of the carrier 19 the warp beam of a loom could be used on to which the wires are wound as warps. These heating wires are led over a guide rake 20 which adjusts the wires for correct distance. The wires are then led to the glass plate 21 illuminated from below, which serves for checking the fine wires for knots and cracks. From the plate 21 the wires pass over the table 22 on which a device 23 is arranged which can be moved parallel to the wires and which serves for welding or brazing on the current supply wires connecting the wires 2 transversally. The wires 2 which are now fitted with transverse connections 24 serving for supplying the current, are now led over a guide cylinder 25 through an adhesive dispenser 26. The adhesive dispenser is formed by two cylinders 27 and 28 and laterally sealed by means of two keys 29. Adhesive can be fed to the dispenser from an adhesive container 30. From the foil rollers 31 and 32 one strand each 33 and 34 is led over the cylinders 27 and 28. Thus the wires are squeezed between the two foils while the latter are joined with the adhesive. The cylinders 35 and 36 press the foils 33 and 34 together after insertion of the adhesive. The foil band which now includes the heating lattice is led, via the roller 38, to the table 39 on which the foils are cut up or rewound to rolls and bales.

Figure 16:
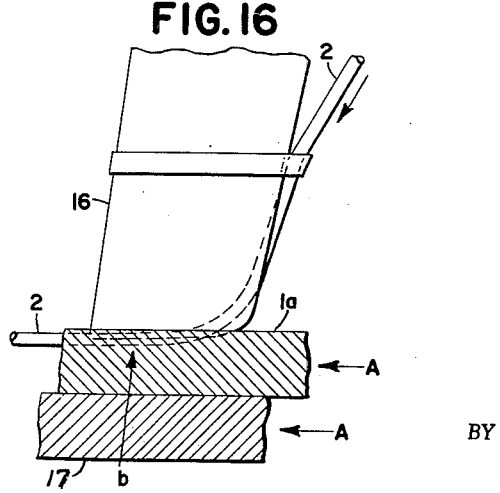
Fig. 16 is a detail view of a heatable sliding guide for wire positioning.
Figure 17:
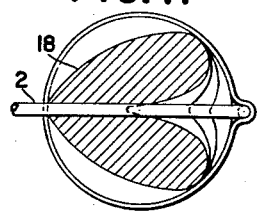
Fig. 17 is a view of the sliding guide in the direction of the arrow B in Fig. 16.

Figs. 16, 17 and 18 show a device for imbedding heating wires into the surface of the film 1a. The process may, for instance, be executed in the following way:

In a common placing device 18 which can be heated electrically, the individual placers 16 according to Figs. 16 and 17 are arranged to which the wires 2 are led. These individual placers 16 are shaped as sliding guides at their lower part through which the wire 2 is led. As these sliding guides are heated, too, when the placing device 18 is heated, heat is transferred to the material 1a of the heating screen whereby the latter is instantaneously and temporarily softened while at the same time the wires are pressed in. The material 1a is arranged on the base 17 only for supporting purposes. The base 17, together with the material 1a, is moved in the direction of the arrow A. For placing the heating wires in wave or zigzag fashion the placing device 18 is moved transversal to the feed direction of the wires periodically for a distance which corresponds to the desired amplitude. As can be seen from Fig. 18 the wires are thus placed in wave fashion on to the material 1a. After cooling of the film, the heating wires 2 are held on the material 1a. The depth of the imbedding operation can be chosen as suitable.

We claim:

1. An electrical heater, comprising an insulating heater body having a heat radiating surface, heating elements embedded in said body, at least parts of said heating elements extending parallel to each other and to said surface, the ratio of the distance between a heating element and a heater body surface to the shortest distance between adjacent heating elements being not smaller than $2/\pi$, each of said heating elements consisting of a wire having a diameter which is at most equal to one tenth of said distance between the heating element and the heater body surface, the wires of the heating elements having the form of waves, the individual heating waves being staggered in relation to each other.

2. An electrical heater, comprising an insulating heater body having a heat radiating surface, heating elements embedded in said body, at least parts of said heating elements extending parallel to each other and to said surface, each of said heating elements consisting of a wire having a diameter which is at most equal to one tenth of said distance between the heating element and the heater body surface, the wires of the heating elements having the form of waves, the individual heating waves being staggered in relation to each other.

3. An electrically heated screen, comprising two vitreous panes of glass, an insulating material embedded between said panes, heating wires embedded in said insulating material, said wires having the form of waves, the amplitude of the waves being smaller than half the mean distance between the waves and the wave length being at least one quarter of the amplitude, the individual waves being in a staggered relation to each other.

References Cited in the file of this patent

UNITED STATES PATENTS

| 1,741,562 | Faguy | Dec. 31, 1929 |
| 1,758,703 | Johnson | May 13, 1930 |
| 1,758,704 | Johnson | May 13, 1930 |
| 1,771,273 | Smith | July 22, 1930 |
| 1,777,343 | Wilson | Oct. 7, 1930 |
| 1,916,895 | Rowe | July 4, 1933 |
| 2,076,343 | Humphner | Apr. 6, 1937 |
| 2,138,217 | Sutter | Nov. 29, 1938 |
| 2,222,742 | Ducret et al. | Nov. 26, 1940 |
| 2,406,367 | Griffith et al. | Aug. 27, 1946 |
| 2,513,993 | Burton | July 4, 1950 |
| 2,523,566 | Glynn | Sept. 26, 1950 |
| 2,526,327 | Carlson | Oct. 17, 1950 |
| 2,533,409 | Tice | Dec. 12, 1950 |
| 2,539,690 | Boorn | Jan. 30, 1951 |
| 2,546,743 | Harrison | Mar. 27, 1951 |
| 2,548,467 | Crise | Apr. 30, 1951 |
| 2,590,328 | Koci | Mar. 25, 1952 |